United States Patent [19]

Cohn

[11] Patent Number: 4,663,568
[45] Date of Patent: May 5, 1987

[54] MULTICHANNEL OR SPARK GAP SWITCH TRIGGERED BY SATURABLE INDUCTOR INDUCED VOLTAGE PULSE

[75] Inventor: David B. Cohn, San Pedro, Calif.

[73] Assignee: Northrop Corporation, Hawthorne, Calif.

[21] Appl. No.: 717,219

[22] Filed: Mar. 28, 1985

[51] Int. Cl.$^4$ ............................................. H05B 37/00
[52] U.S. Cl. ................................... 315/163; 315/166; 372/38
[58] Field of Search .................. 315/163, 166; 372/30, 372/38

[56] References Cited

U.S. PATENT DOCUMENTS

| | | | |
|---|---|---|---|
| 2,874,333 | 2/1959 | Gray | 315/166 |
| 3,515,938 | 6/1970 | Morse | 315/166 |
| 4,039,971 | 8/1977 | Wang et al. | 372/38 |
| 4,071,806 | 1/1978 | List | 372/38 |

Primary Examiner—James C. Yeung
Attorney, Agent, or Firm—Terry J. Anderson; Robert B. Block

[57] ABSTRACT

An improved electrical gap switch for use with pulsed gas discharge lasers. The closure of a spark gap, railgap, or other multichannel switch is triggered by the application of a second voltage in combination with the primary voltage that is closed by the switch. The second voltage is of opposite polarity and applied to an electrode opposite from that to which the primary voltage is applied. The second voltage has a more rapid rise time than that of the first, and its application to the switch is momentarily isolated from the load by a saturable inductor. Following triggering of the switch by the combination of voltages, the inductor saturates and provides a low impedance path for the voltage and charge from the primary source to the load.

7 Claims, 4 Drawing Figures

MULTICHANNEL OR SPARK GAP SWITCH TRIGGERED BY SATURABLE INDUCTOR INDUCED VOLTAGE PULSE

BACKGROUND OF THE INVENTION

1. Field of the Invention

This invention pertains to electrical switches for switching high voltage, high current sources. More particularly, this invention pertains to switches used in high voltage, high current applications as the switching of energy sources used to pump pulsed gas discharge lasers.

2. Description of the Prior Art

Spark gap switches, railgap switches, and other multichannel switches have been used in the prior art to connect a high voltage, high current energy source to a load such as a pulsed gas discharge laser. For use with such lasers, the switch must operate to connect suddenly a high voltage, high current source to the load and the switch must provide a low impedance path for the current.

FIG. 1 depicts a railgap switch that has been used in the prior art with pulsed gas discharged lasers. A blade (1) having a rectangular cross section, typically of ½ inch by 1/16th inch in size, and a length of 50 centimeters or so, is mounted adjacent to, but separated from, a second electrode, commonly referred to as the plane (2), having a somewhat larger cross section than the blade and being of approximately the same length as the blade. The space or gap between the blade (1) and the plane (2) is filled with a gas (3) contained by enclosure (4) which enclosure is made out of non-conducting material.

In the prior art, capacitor (5) is charged to a high voltage by high voltage source (6). The side of the capacitor (5) that is connected to high voltage source (6) is then suddenly shorted to ground by thyratron (7) which causes the charge and voltage on capacitor (5) to be placed suddenly across blade (1) to ground. In the prior art, the high voltage causes the gas (3) within enclosure (4) to break down and form multiple conducting paths between blade (1) and plane (2), which conducting paths, in effect, short the switch and connect the voltage and charge on capacitor (5) across laser (8), to ground thus causing the charge on capacitor (5) to discharge in a short period of time through gas discharge laser (8).

In the prior art device, when the voltage between blade (1) and plane (2) exceeded the breakdown voltage of the gas, the statistical processes associated with the breakdown of the gas caused undesirable variations or jitter in the timing of the breakdown of the gas and in the timing of the effective closure of the switch. Various triggering schemes have been used to reduce the temporal jitter in the switch closure. For instance, auxiliary spark discharges have been used to generate ultra-violet radiation, which, in turn, tends to trigger the breakdown of the gas when the voltage between the plane and blade is comparable to, but less than, the self-breakdown voltage of the gas. Auxiliary lasers which inject laser energy into the gas (3), also have been used for this purpose. These prior art methods, however, suffer from electrode erosion in the case of auxiliary spark gaps, and from complexity in the case of auxiliary lasers.

SUMMARY OF THE INVENTION

Rather than use an auxiliary laser of an ultra-violet source to trigger the gas breakdown, the present invention uses a second, high voltage source of opposite polarity to that of the voltage source of the prior art devices, which second source is connected to the plane of the railgap switch. The plane of the switch is momentarily isolated from the load and ground by the high impedance of a saturable inductor that is connected between the plane and the load. The second voltage source has a relatively rapid risetime which, when combined with the primary voltage source, reaches and exceeds the self-breakdown voltage of the gas and thus triggers the gas breakdown. After the breakdown begins and the switch effectively closes, the inductor saturates and provides a low impedance path from the switch to the laser or other load.

DESCRIPTION OF THE PREFERRED EMBODIMENT

Figure 1:
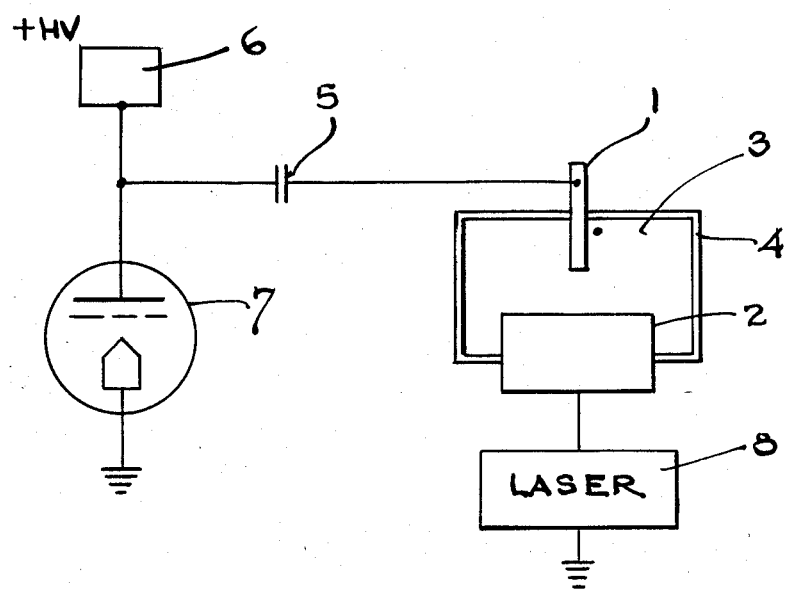
FIG. 1 depicts a prior art device.
Figure 2:
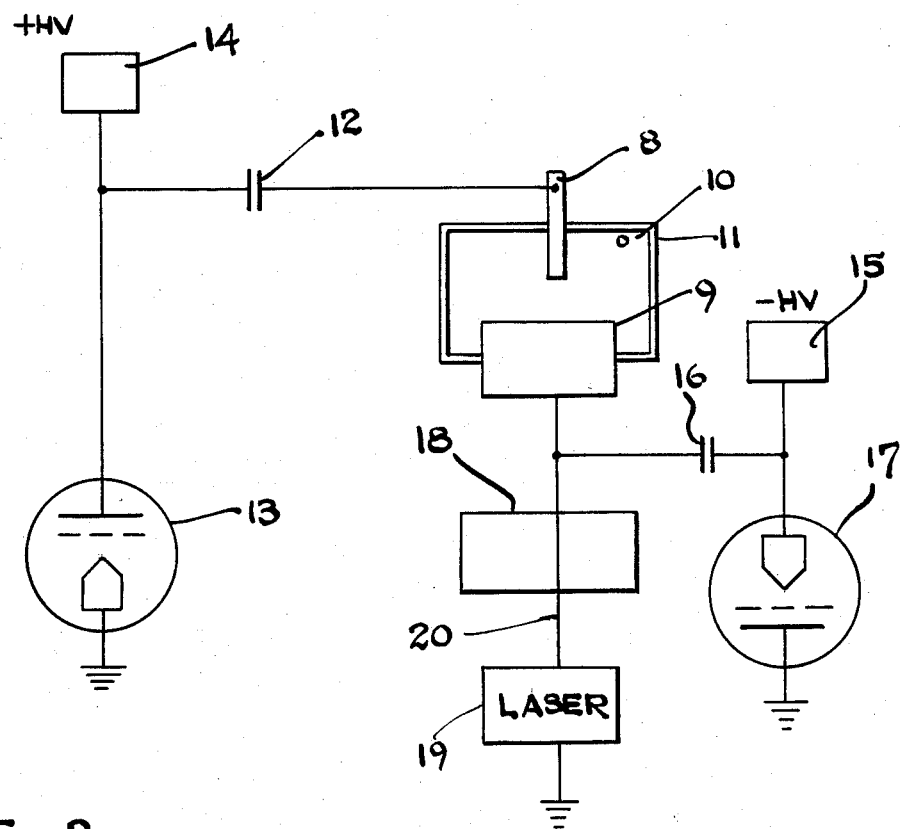
FIG. 2 is a schematic drawing of the invention.

FIG. 2 depicts the present invention. The blade (8), plane (9), gas (10), enclosure (11), capacitor (12) and thyratron (13) depicted in FIG. 2 are similar to the similar elements depicted in FIG. 1. The high voltage source (14) in FIG. 2 also is similar to that of the prior art depicted in FIG. 1, except that the voltage from source (14) is less than the self-breakdown voltage of the switch.

As depicted in FIG. 2, the preferred embodiment of the present invention additionally has a second high voltage source (15) which, relative to ground, has a polarity opposite to source (14). Source (15) charges capacitor (16) and then is shorted to ground by thyratron (17), thus causing the voltage and charge on capacitor (15) to be connected from plane (9) to ground.

Plate (9) is connected through saturable inductor (18) to laser (19) and then to ground. When thyratron (17) shorts source (15) to ground, and thus connects the voltage and charge on capacitor (16), between plane (9) and ground, saturable inductor (18), for a short period of time before saturation, exhibits a high impedance, thus allowing the voltage on capacitor (16) to be applied to plane (9). The combination of the voltage from capacitor (12) placed on blade (8) and the voltage from capacitor (16) of opposite polarity placed on plane (9), significantly exceeds the self-breakdown voltage of gas (10), and causes the closure of the switch. Following gas breakdown and the closure of the switch, that is, following the effective formation of a connection between blade (8) and plane (9) by the conducting gas, saturable inductor (18) saturates and exhibits a low impedance path from plane (9) to laser (19) which is the load in this embodiment of the invention.

The sizes of capacitors (12) and (16) and the locations and characteristics of sources (14) and (15) and of thyratrons (13) and (17), and the interconnections are such that the voltage placed on the blade (8) by capacitor (12) has a relatively slow rise time of the order of ½ a microsecond, while the voltage impressed on plane (9)

by capacitor (16) has a relatively rapid rise time and a duration of approximately 20 nano-seconds.

Figure 3:
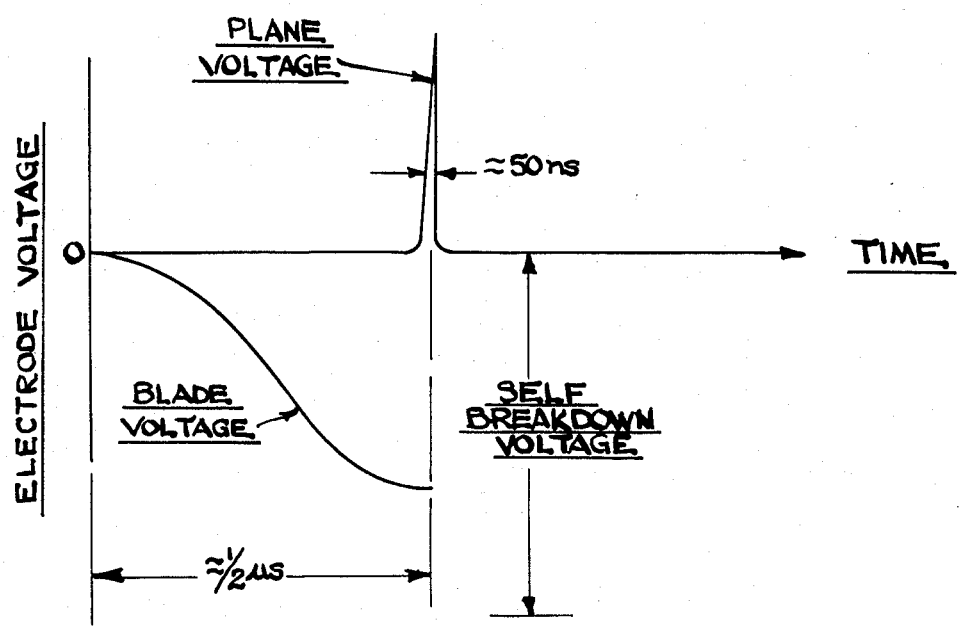
FIG. 3 is illustrates the temporal relationships between the voltages supplied by the first and second sources.

The rise time and duration of the voltages placed on blade (8) and plane (9), are depicted in FIG. 3. The capacitance of capacitor (12) is much greater than that of capacitor (16), and supplies most of the current and energy transferred to the pulsed discharge gas laser by the switch. As a consequence, the voltage and charge on capacitor (16) is quickly overwhelmed by that of capacitor (12) following breakdown of the gas.

In the preferred embodiment, saturable inductor (18) is fabricated by winding many layers of a ribbon of magnetic material such as "Met Glass" around the heavy metal connection (20) between the plane (9) and laser (19). For instance, a ribbon of Met Glass having a width of four inches and a thickness of two mils, may be used to form the inductor. In this case, approximately 500 layers of such Met Glas is interleaved with mylar sheets of one mil thickness and are wound around the conductor (20) to form saturable inductor (18). Other magnetic materials could instead be used to form the saturable inductor so long as the rise times and the saturation levels of the material are appropriate for operation of the device.

In the operation of the invention, the saturable inductor (18) remains unsaturated for approximately 25 nanoseconds after application of the voltage from capacitor (16). After initial saturation of inductor (18) brought about by current from capacitor (16) and coincident breakdown of the multichannel switch, current from capacitor (12) saturates the inductor (18) in the reverse direction and negative current flows from capacitor (12) to laser (19) or whatever other load is connected to the invention.

In the preferred embodiment, thyratrons (13) and (17), are used to rapidly connect capacitors (12) and (16) to ground. Other switching mechanisms, however, could be used for this purpose. Capacitors (12) and (16) also may be simply banks of capacitors or could be, particularly in the case of capacitor (12), a transmission line capacitor using a water dielectric.

Figure 4:
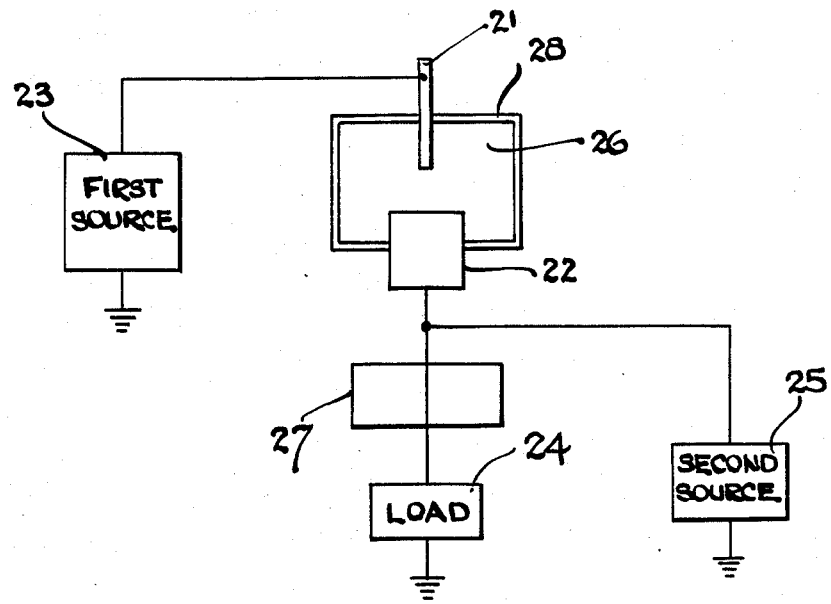
FIG. 4 is a block diagram of the invention.

FIG. 4 depicts the basic elements of the invention. A switch (28), such as a spark gap, or a multichannel switch such as a railgap switch using a blade (21) and a plane (22), is used to connect the voltage and current from a first source (23) of such voltage and current to load (24). In this invention, a second source (25) of voltage and current is connected to switch (28) as depicted in FIG 4. The second source has a polarity opposite to that of the first source and, in effect, is combined with the first source to place a voltage across switch (28), which exceeds the self breakdown of gas (26) within the switch. Saturable inductor (27) momentarily presents a high impedance which allows the voltage from second source (25) to be placed on plane (22) the voltage from second source (25) to be placed on plane (22) and, in effect, added to the voltage from the first source, thus, initiating gas breakdown. As described above, saturable inductor (27) then saturates to provide a low impedance connection from first source (23) to load (24). In so doing, saturable inductor (27) may, in some circumstances, be momentarily saturated in one direction by application of the voltage from second source (25) before being saturated in the opposite direction by application of the voltage from first source (23) through switch (28).

I claim:

1. An improved electrical gap switch of the type having first and second electrodes enclosed in a container filled with a gas and having a first source of voltage and current connected from a ground reference point to the first electrode, the first source having a polarity with respect to the ground and a rise time and a duration, the switch operating to connect the first source to a load, and the switch having a self break down voltage, the improvements comprising:
    a saturable inductor connected between the second electrode and the load,
    a second source of voltage and current connected between the second electrode and the ground reference point and having a polarity relative to ground opposite to the polarity of the first source, the first and second sources together supplying a voltage across the gap switch of a magnitude in excess of the self break down voltage of the switch, the inductor remaining unsaturated for a period of time sufficient for the gas in the switch to break down and the inductor then saturating so as to provide a low impedance path from the first source to the load.

2. The switch described in claim 1 wherein the electrical gap switch is a multichannel gap switch.

3. The switch described in claim 1 wherein the electrical gap switch is a spark gap switch.

4. An improved gas-filled electrical gap switch of the type having first and second electrodes enclosed in a container filled with a gas and having a first source of voltage and current connected from a ground reference point to the first electrode, the first source having a polarity with respect to the ground and a rise time and a duration, the switch operating to connect the first source to a load, the first source of voltage and current comprising:
    a first capacitor,
    first charging means for charging the first capacitor,
    said first capacitor being connected between said first charging means and said first electrode, and
    first grounding means for shorting the connection between the first capacitor and the first charging means to ground,
    said switch having a self breakdown voltage,
    a saturable inductor connected between the second electrode and the load,
    a second source of voltage and current connected between the second electrode and the ground reference point and having a polarity relative to ground opposite to the polarity of the first source,
    a second capacitor,
    second charging means for charging the second capacitor,
    the second capacitor being connected between the second charging means and the second electrode, and
    second grounding means for shorting the connection between the second capacitor and the second charging means to ground, the rise time and duration of the voltage from the second source of voltage and current being substantially shorter than the rise time and duration of the voltage from the first source of voltage and current,
    said first and second sources together supplying a voltage across the gap switch of a magnitude in excess of the self breakdown voltage of the switch, the inductor remaining unsaturated for a period of time sufficient for the gas in the switch to break down and the inductor then saturating so as to provide a low impedance path from the first source to the load.

5. The switch as in claim 4 wherein the electrical gap switch is a multichannel gap switch.

6. The switch as in claim 4 wherein the electrical gap switch is a spark gap switch.

7. In an electrical gap switch and firing circuit for connecting a high voltage/current source to a load, an electrical gap switch of the type having first and second electrodes enclosed in a container filled with a gas, said switch having a self breakdown voltage, a first source of voltage and current connected from a ground reference point to the first electrode, said first source having a polarity with respect to the ground and a rise time and a duration, said switch operating to connect said first source to a load, a saturable inductor connected between the second electrode and the load, a second source of voltage and current connected between the second electrode and the ground reference point and having a polarity relative to ground opposite to the polarity of the first source, the first and second sources together supplying a voltage across the gap switch of a magnitude in excess of the self breakdown voltage of the switch, the inductor remaining unsaturated for a period of time sufficient for the gas in the switch to break down and the inductor then saturating so as to provide a low impedance path from the first source to the load.

* * * * *